United States Patent
Wang et al.

(10) Patent No.: US 9,473,821 B2
(45) Date of Patent: Oct. 18, 2016

(54) TELEVISION

(71) Applicant: SHENZHEN SKYWORTH-RGB ELECTRONICS CO. LTD., Shenzhen, Guangdong (CN)

(72) Inventors: Zhi-Guo Wang, Guangdong (CN); Xian-Hui Zeng, Guangdong (CN); Wei-Ji Chen, Guangdong (CN)

(73) Assignee: SHENZHEN SKYWORTH—RGB ELECTRONICS CO. LTD., Shenzhen, Guangdong (CN)

( * ) Notice: Subject to any disclaimer, the term of this patent is extended or adjusted under 35 U.S.C. 154(b) by 54 days.

(21) Appl. No.: 14/067,324

(22) Filed: Oct. 30, 2013

(65) Prior Publication Data
US 2014/0173656 A1   Jun. 19, 2014

(30) Foreign Application Priority Data

Dec. 14, 2012 (CN) .......................... 2012 1 0544287

(51) Int. Cl.
*H04N 21/482* (2011.01)
*H04N 21/422* (2011.01)
*H04N 21/44* (2011.01)

(52) U.S. Cl.
CPC ...... *H04N 21/482* (2013.01); *H04N 21/42204* (2013.01); *H04N 21/44008* (2013.01); *H04N 21/4828* (2013.01)

(58) Field of Classification Search
CPC ..................... G06F 17/3002; H04N 21/8586; H04N 21/4312; H04N 21/4314; H04N 21/4826
USPC ...... 725/39, 48, 51, 100, 109–110; 348/734; 345/156, 168
See application file for complete search history.

(56) References Cited

U.S. PATENT DOCUMENTS

| | | | | |
|---|---|---|---|---|
| 5,517,257 A | * | 5/1996 | Dunn ................. | H04N 5/44582 348/734 |
| 2009/0061841 A1 | * | 3/2009 | Chaudhri et al. ............. | 455/420 |
| 2009/0133069 A1 | * | 5/2009 | Conness ........... | H04N 5/44543 725/46 |
| 2010/0199312 A1 | * | 8/2010 | Chang ............... | G06F 17/30053 725/46 |
| 2010/0262995 A1 | * | 10/2010 | Woods et al. .................. | 725/40 |
| 2011/0289534 A1 | * | 11/2011 | Jordan ............... | G06F 17/3002 725/48 |
| 2012/0295661 A1 | * | 11/2012 | Kim ....................... | G06F 3/017 455/556.1 |
| 2013/0031592 A1 | * | 1/2013 | Choi .................. | H04N 21/4433 725/110 |
| 2013/0128824 A1 | * | 5/2013 | Rothschild ..................... | 370/329 |
| 2014/0082682 A1 | * | 3/2014 | Choi .................. | H04N 21/4345 725/100 |
| 2014/0259073 A1 | * | 9/2014 | Ellis et al. ...................... | 725/47 |

* cited by examiner

*Primary Examiner* — Brian T Pendleton
*Assistant Examiner* — Alan Luong
(74) *Attorney, Agent, or Firm* — Locke Lord LLP; Tim Tingkang Xia, Esq.

(57) ABSTRACT

In one aspect of the invention, a TV includes a TV service module, a user service module, a media service module, a system service module, and a user interface (UI) view service module. The TV service module is adapted for providing a standard interface. The user service module is adapted for managing users of a cloud platform to which the TV belongs. The media service module is adapted for collecting resources. The system service module is adapted for forwarding an instruction corresponding to a broadcast sent by a remote control to a corresponding module. The UI view service module is adapted for analyzing a component invoking instruction sent by another module in the TV, and selecting an invoked component according to data carried in the component invoking instruction. Embodiments of the invention can reduce operations of a user and improves the user experience.

15 Claims, 3 Drawing Sheets

TELEVISION

CROSS-REFERENCE TO RELATED APPLICATION

This application claims the priority to Chinese Patent Application No. CN201210544287.5, filed on Dec. 14, 2012, in the State Intellectual Property Office of P.R. China, which is hereby incorporated herein in its entirety by reference.

FIELD OF THE INVENTION

The invention relates generally to the field of televisions, and more particularly, to a television in which various applications are compatible and operable at the same time.

BACKGROUND OF THE INVENTION

With the development of technologies such as smart phones, tablet computers, and the Internet, the concept of intelligence gradually emerges in the field of televisions (TVs). In addition to the normal viewing functions, a TV having an operating system installed and carrying and running diversified applications has increasingly strong functions.

Currently, operating systems installed in smart TVs are mostly customized on the basis of an Android system. The Android system is mainly developed and designed for touchable intelligent mobile devices. Basically, current TVs do not have touch screens, and furthermore, Android-based applications and functions installed therein are usually independent from one another and are exclusive to one another in use, that is to say, only one application or function is allowed to be in an active state at the same time. Therefore, the operating manner and using mode of the TVs bring a lot of inconvenience to a user.

For example, when the user intends to switch to a different application, the user must press a Return button or Home button to exit the current application, move the focus by using direction buttons, and then open another application by pressing an OK button, which not only is complicated in operation, but also affects or interrupts the current use of the user (e.g., the user has to stop viewing the program to open another function).

In addition, applications or functions on the TV are independent from one another, and are disconnected to one another. Moreover, each application, when being in the active state, occupies the whole screen, so the user, when operating one application or function, can hardly use another application or function, but the characteristic of the TV has a large screen, which can definitely satisfy hardware requirements of multiple applications being in the active state at the same time. In other words, the current operating system cannot give full play to the characteristic of the TVs.

In view of the above, there exist shortcomings, such as applications not being compatible with each other at the same time so that the operation is complicated and brings inconvenience to the user, in the operating system of the current smart TVs.

Therefore, a heretofore unaddressed need exists in the art to address the aforementioned deficiencies and inadequacies.

SUMMARY OF THE INVENTION

On aspect of the invention provides a TV, to solve the problems of a conventional Android-based TV in which multiple applications cannot be compatible at the same time so that the operation is complicated and brings inconvenience to a user.

In one embodiment, the TV includes a TV service module, a user service module, a media service module, a system service module, and a user interface (UI) view service module.

The TV service module is used for providing a standard interface for unifying digital television (DTV), analog television (ATV), and internet protocol television (IPTV) services.

The user service module is used for managing users of a cloud platform to which the TV belongs, and executing a corresponding operation according to a one-button sharing instruction, a push instruction, and a reservation instruction sent by a user.

The media service module is used for collecting resources of an external device or a back server, and integrating the collected resources.

The system service module is used for receiving a broadcast sent by a remote control, and forwarding an instruction corresponding to the broadcast sent by the remote control to a corresponding module, so that the corresponding module executes a corresponding operation.

The UI view service module is used for analyzing a component invoking instruction sent by another module in the TV, and selecting an invoked component according to data carried in the component invoking instruction, so as to execute an operation corresponding to the component invoking instruction, where the operation includes: an operation of displaying data on a current interface or current application, an operation of hiding data, and an operation of adding data.

In another aspect, the invention relates to a method for operations of a TV. In one embodiment, the method includes the following steps:

providing a standard interface for unifying DTV, ATV and IPTV services, by a TV service module;

managing users of a cloud platform to which the TV belongs, and executing a corresponding operation according to a one-button sharing instruction, a push instruction, and a reservation instruction, by a user service module;

collecting resources of an external device or a back server, and integrating the collected resources, by a media service module;

receiving a broadcast sent by a remote control, and forwarding an instruction corresponding to the broadcast sent by the remote control to a corresponding module, by a system service module, so that the corresponding module executes a corresponding operation; and analyzing a component invoking instruction sent by another module in the TV, and selecting the invoked component according to data carried in the component invoking instruction, by a UI view service module, so as to execute an operation corresponding to the component invoking instruction, wherein the operation comprises an operation of displaying data on a current interface or current application, an operation of hiding data, and an operation of adding data.

In yet another aspect, the invention relates to a non-transitory computer-readable medium storing instructions which, when executed by one or more processors, cause the above-disclosed TV to perform the foregoing method of operations.

In the embodiments of the invention, most functions of the TV are integrated to background services, and all the functions are in a background standby state, so that when a user requires a specific function, the service corresponding to the specific function can respond to the request of the user immediately. Therefore, various applications installed in the TV provided in the embodiments of the invention can be compatible at the same time, so that the user can operate multiple applications at the same time, thereby simplifying the operation and improving the user experience.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION OF THE INVENTION

Figure 1:
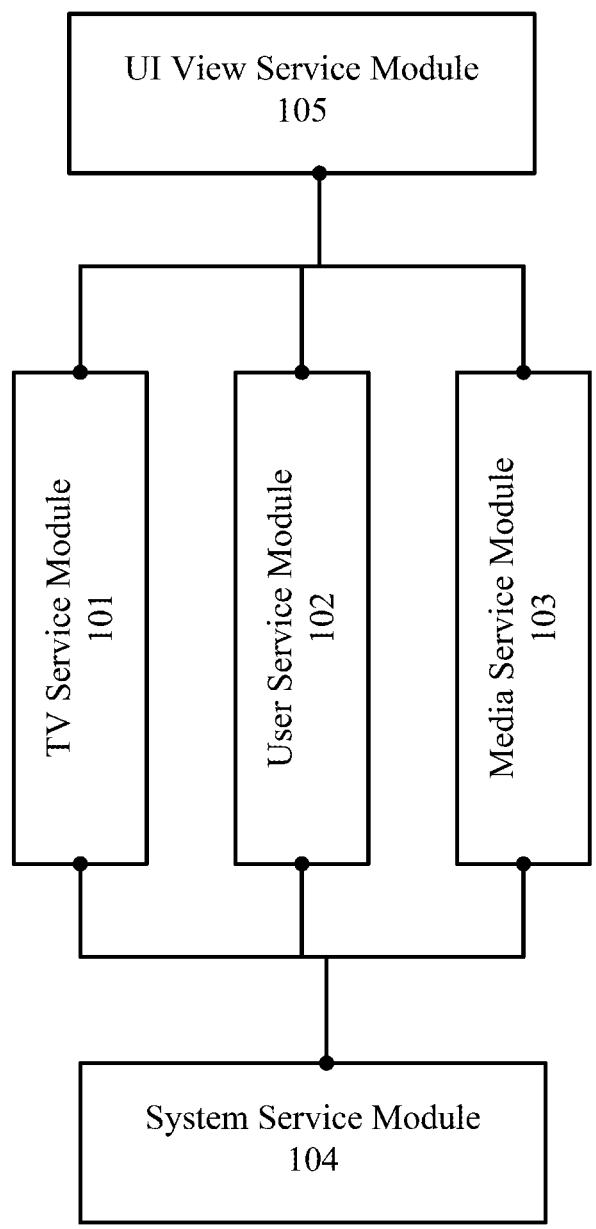
FIG. 1 shows schematically a structural diagram of a TV according to Embodiment 1 of the invention.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are configured to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only configured to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

The description will be made as to the embodiments of the present disclosure in conjunction with the accompanying drawings in FIGS. 1-3. It should be understood that specific embodiments described herein are merely used for explaining the invention, but are not intended to limit the invention. In accordance with the purposes of this disclosure, as embodied and broadly described herein, this invention, in one aspect, relates to a television in which various applications are compatible and multiple applications can be operable at the same time.

In one aspect of the invention, the TV includes a TV service module, a user service module, a media service module, a system service module, and a UI view service module. These modules are integrated into background services, all functions are in background standby state, and data is displayed on a current interface or current application by using the UI view service module, so that multiple applications installed in the TV can be compatible and operable at the same time.

In another aspect, the invention relates to a method for operations of the above TV. In one embodiment, the method includes the following steps:

(a) providing a standard interface for unifying digital television (DTV), analog television (ATV) and internet protocol television (IPTV) services, by the TV service module;

(b) managing users of a cloud platform to which the TV belongs, and executing a corresponding operation according to a one-button sharing instruction, a push instruction, and a reservation instruction, by the user service module;

(c) collecting resources of an external device or a back server, and integrating the collected resources, by the media service module;

(d) receiving a broadcast sent by a remote control, and forwarding an instruction corresponding to the broadcast sent by the remote control to a corresponding module, by the system service module, so that the corresponding module executes a corresponding operation; and (e) analyzing a component invoking instruction sent by another module in the TV, and selecting the invoked component according to data carried in the component invoking instruction, by the user interface (UI) view service module, so as to execute an operation corresponding to the component invoking instruction. The operation includes, but not limited to, an operation of displaying data on a current interface or current application, an operation of hiding data, and an operation of adding data.

In one embodiment, the method may further includes at least one of searching for network and local resources according to a key word or type input by the user; and receiving an operation instruction sent by an external device, and executing a corresponding operation according to the operation instruction, where the operation instruction includes, but not limited to, acquiring hardware information of the TV, and selecting an application of the TV.

In one embodiment, the step of receiving the operation instruction sent by the external device, and executing the corresponding operation according to the operation instruction comprises receiving a connection request of the external device; and after a connection with the external device is established, receiving the operation instruction sent by the user through a screen of the external device, or receiving the operation instruction sent by the user through a screen of the external device, and executing the corresponding operation according to the operation instruction.

In one embodiment, the method further includes recognizing a station caption of an ATV, and acquiring a current channel of the ATV; and capturing an electronic program guide (EPG) of a DTV, and sending the captured EPG to the current channel of the ATV, by the TV service module. After the captured EPG is sent to the current channel of the ATV, the method may also include capturing details or a video corresponding to the EPG in the IPTV.

In one embodiment, the method further includes setting and acquiring a configuration item, and communicating with the UI View service, so as to call up a menu of the configuration item; setting system time, and setting an environment variable corresponding to the system time; and setting a system language, and setting an environment variable corresponding to the system language, by the system service module.

These and other aspects of the invention will become apparent from the following description of the preferred embodiment taken in conjunction with the following drawings, although variations and modifications therein may be effected without departing from the spirit and scope of the novel concepts of the invention.

Embodiment 1

FIG. 1 shows schematically a structure of a TV according to a first embodiment of the invention. To facilitate illustration, only parts related to this embodiment are shown.

In this exemplary embodiment shown in FIG. 1, the TV includes a TV service module 101, a user service module 102, a media service module 103, a system service module 104, and a UI view service module 105. The system service module 104 is a bottom service module of the TV. The TV service module 101, the user service module 102 and the media service module 103 are intermediate service modules of the TV, which are used for providing functions of browsing and operating TV content, user information and media. The UI view service module 105 is a UI service module of the TV, which integrates all desired UI programs, for other service modules to call up at any time.

The TV service module 101 is used for providing a standard interface for unifying Digital Television (DTV), Analog Television (ATV) and Internet Protocol Television (IPTV) services.

In this embodiment, the TV service module 101 is used for providing a standard interface for unifying services provided by a DTV, an ATV and an IPTV. The DTV invokes a drive by using a standard interface of related intermediate layers. The ATV invokes a drive by using ATV plugins of different platforms. The IPTV invokes a drive by using media player plugins of different platforms and a data butting standard interface. The TV service module 101 provides a basic interface related to the DTV and IPTV, for being invoked by a third party application for development. For example, real-time comment on a TV program enables a user to perform real-time interaction while watching the program.

In addition, the TV service module 101 is further used for recognizing a station caption of the ATV, acquiring a current channel of the ATV; capturing an electronic program guide (EPG) of the DTV, and sending the captured EPG to the current channel of the ATV.

In the embodiment, the TV service module 101 may provide a corresponding EPG to a TV assistant, and can also recognize the station caption of the ATV, capture the EPG on the DTV, and notifies a user using the ATV of programs to be played, where the EPG of the DTV can be acquired by the user without purchasing a DTV, so when the user does not have a DTV, the user can still know programs to be played.

Further, after sending the captured EPG to the current channel of the ATV, the TV service module 101 acquires details or a video, corresponding to the EPG, in the IPTV.

In the embodiment, the TV service module 101 integrates advantages of the IPTV, acquires the EPG of the DTV by using the current frequency acquired through the station caption of the ATV, and acquires the related details or related video of the IPTV by using the EPG of the DTV. As such, when a user does not have the IPTV, the user can also perform related comment on the watching program on the ATV, and view, on the ATV, the related details and video of the program being currently played.

The user service module 102 is used for managing users of a cloud platform to which the TV belongs, and executing a corresponding operation according to a one-button sharing instruction, a push instruction, and a reservation instruction sent by the user. In the embodiment, the user service module 102 implements functions of the cloud platform, such as user management, one-button sharing, pushing, and reservation.

The media service module 103 is used for collecting resources of an external device or back server, and integrating the collected resources. In the embodiment, the media service module 103 mainly provides functions of collecting and viewing of external device resources or back server resources, and integrating and caching management of network movies, music and information content. After acquiring the external device resources or data of the back server, the media service module 103 invokes the UI view service module 105 to display the acquired data.

The system service module 104 is used for receiving a broadcast sent by a remote control, and forwarding an instruction corresponding to the broadcast sent by the remote control to a corresponding module, so that the corresponding module executes a corresponding operation. In the embodiment, the system service module 104 processes a full channel event, that is, uniformly receives a command broadcasted through a button of the remote control, and forwards the received command. For example, when Home button information broadcasted by the remote control is received, return to a home page; when Shuttle button information, send a command to the UI view service module 105, so that the UI view service module 105 shows TV content obtained after the user slides the Shuttle button. In addition, during signal source switch, the system service module 104 sends a command to notify the TV service module 101; when the user presses one-button sharing, the system service module 104 sends a command to notify the user service module 102.

As a preferred embodiment, the system service module 104 is further used for setting and acquiring a configuration item, communicating with the UI view service module 105, and calling up a configuration menu item; setting system time and setting an environment variable corresponding to the system time; setting a system language and setting an environment variable corresponding to the system language.

In the embodiment, the system service module 104 is mainly used for coordinating communications between different service modules, for example, (1) providing a command for another module to set and acquire the environment variable, and send a broadcast command notification when the environment variable changes; (2) setting and acquiring the configuration item, communicating with the UI view service module 105, and calling up a configuration menu ring; (3) being started along with the system during booting, and starting other service modules; (4) setting the system time: monitoring to see whether the network is connected to the back server, if yes, acquiring the current time from the back server, and setting the time in the system; and meanwhile setting the environment variable of the current time, and sending the time to be displayed on a UI status bar; (5) providing a command of acquiring all languages supported by the system and the current system language; (6) setting the system language: when the system service module 104 starts, setting the system language, and setting the environment variable of the current language, and when the language changes, setting the environment variable of the current language and sending a broadcast command with the language changed.

The UI view service module 105 is used for analyzing a component invoking instruction sent by another module in the TV, and selecting an invoked component according to data carried in the component invoking instruction, so as to execute an operation corresponding to the component invoking instruction, where the operation includes: an operation of displaying data on a current interface or current application, an operation of hiding data, and an operation of adding data.

In the embodiment, when the service module in the TV requires to invoke the UI view service module 105, the service module may have data sent in through sending a command SkyCmd and inheriting several data encapsulation subclasses of data based class SkyData, and the UI view service module 105 determines the invoked component type by analyzing the data sent along with the command, so as to determine which operation is performed. The operation includes, but not limited to, an operation of displaying data on a current interface or current application, an operation of hiding data, an operation of adding data, and the like.

According to the exemplary embodiment of the invention, the TV includes the TV service module, the user service module, the media service module, the system service module, and the UI view service module. Most functions of the TV are integrated into the background services, all functions are in background standby state, so when the user requires a specific function, the service corresponding to the specific function can respond to the request of the user immediately. Therefore, multiple applications installed in the TV are compatible at the same time, so that the user can operate multiple applications at the same time, thereby simplifying the operation and improving the user experience.

Embodiment 2

Figure 2:
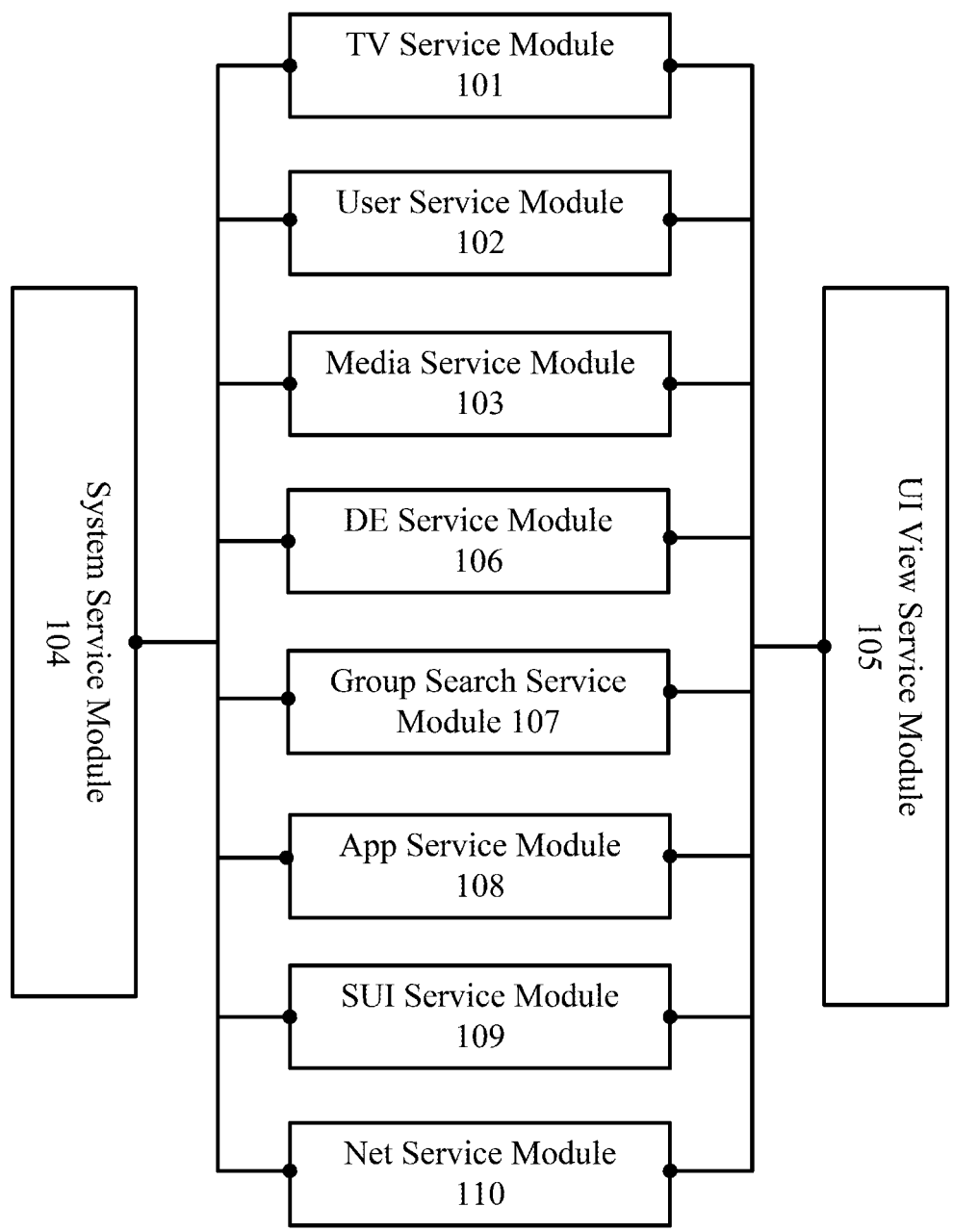
FIG. 2 shows schematically a structural diagram of another TV according to Embodiment 2 of the invention.
Figure 3:
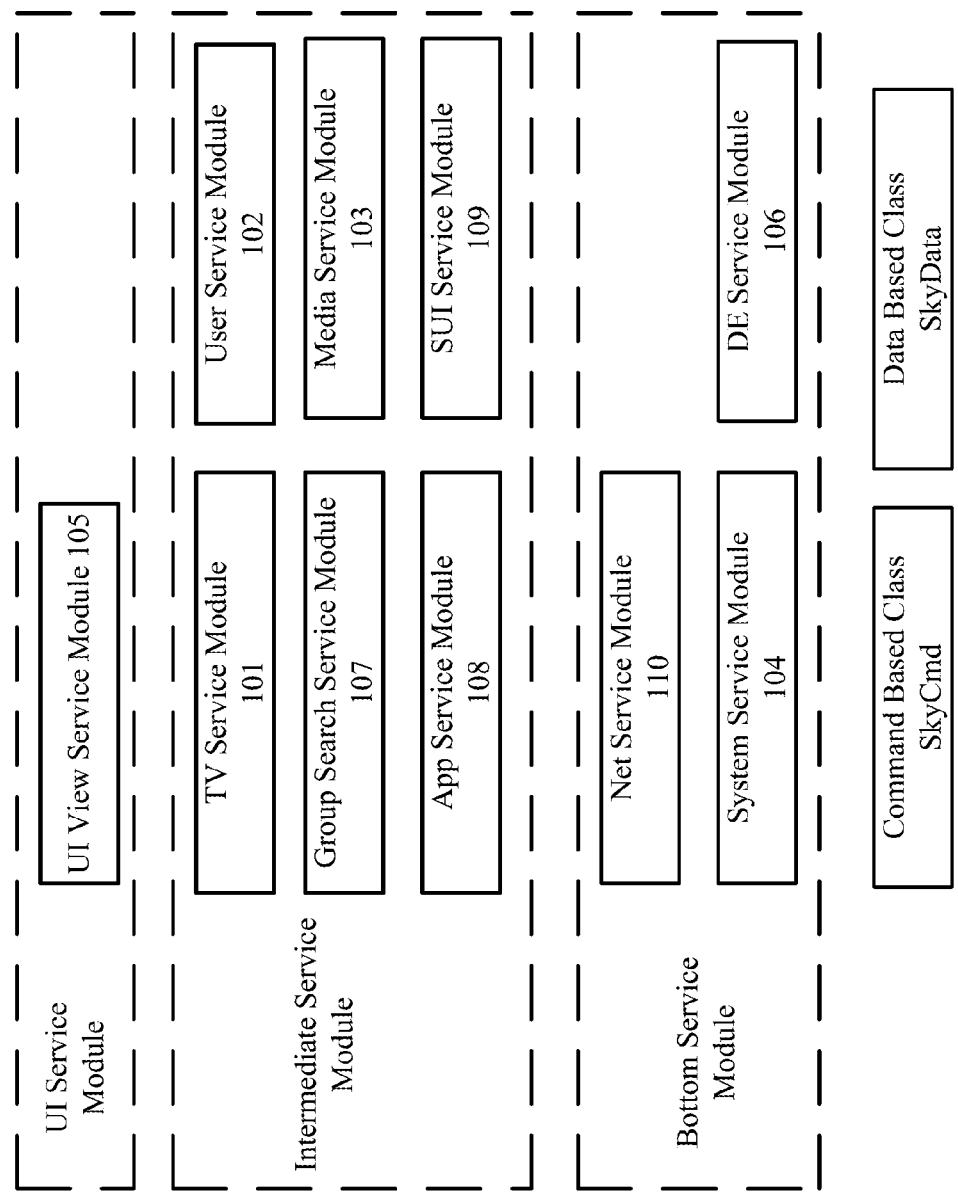
FIG. 3 is a schematic layered diagram of the TV according to Embodiment 2 of the invention.

FIG. 2 shows schematically a structure of another TV according to a second embodiment of the invention. In addition to the TV of the first embodiment shown in FIG. 1, the TV further includes a data exchange service (DE service) module 106 and/or a group search service module 107.

The DE service module 106 is used for receiving an operation instruction sent by an external device, and executing an operation corresponding to the operation instruction, where the operation instruction includes acquiring hardware information of the TV, and selecting an application of the TV. In this embodiment, the DE service module 106 is mainly responsible for communication and interaction between the TV and another external device in the same sub-network, such as communication and interaction between a DE service module of the TV and a DE service module of a mobile phone or a DE service module of a tablet computer. The external device communicates, by using the DE service module installed in the external device, with the DE service module 106 installed on the TV by using, and sends the operation instruction of acquiring the hardware information of the TV or selecting a certain application in the TV, so that the DE service module 106 of the TV, after receiving the operation instruction sent by the external device, for example, receiving a hardware information acquisition instruction sent by the external device, acquires the hardware information of the TV.

As a preferred embodiment, the step of the DE service module 106 receiving the operation instruction sent by the external device, and executing the corresponding operation according to the operation instruction specifically includes: receiving a connection request of the external device; after a connection is established with the external device, receiving an operation instruction sent by a user through a screen of the external device, or receiving an operating instruction sent by a user through a screen of the external device, and executing a corresponding operation according to the operation instruction. In this embodiment, the DE service module 106 of the TV starts when the TV is started, and waits for the connection request of the external device; the DE service module of the external device can run on the device as a separate program, and can also be added to a third party program as an extended function for providing an interaction channel between another program and the TV. After the TV is connected to the external device, the user (1) may use the external device as a remote control of the TV, and may also simulate operations such as a mouse and touch on the TV by using a touch screen of the external device; (2) may acquire hardware information of the TV through the external device; (3) may input voice information through a microphone (MIC) of the external device, and use functions such as language of the TV. The interaction between the application of the external device and the TV is performed uniformly by using the DE service module of the external device, which then communicates with the DE service module 106 of the TV. The DE service module 106 of the TV, after receiving the command, invokes a corresponding function module to complete information acquisition or execute a corresponding operation. In contrast, if the TV requires sending information or operation to the external device, the information or a command is sent to the external device by using the DE service module 106 of the TV, and the DE service module of the external device, after receiving an instruction, sends the instruction to an application for execution.

The group search service module 107 is used for searching network and local resources according to a key work or type input by the user. In this embodiment, the group search service module 107 provides a group search service, specifically, searches the network and local resources according to the key word or type input by the user, and invokes the UI view service module 105 to show the searched resources.

In addition, the TV also includes an Application service (App service) module 108. The App service module 108 is used for searching for a local application, deleting a local application, and used for searching, downloading managing, or deleting a network application. In this embodiment, the App service module 108 is used for providing a management service for local and online network applications, and is connected to the group search service module 107, so as to traverse and search the local application and network application, and execute a corresponding operation according to the instruction sent by the user, for example, deleting an application designated by the user according to an application deletion instruction sent by the user; downloading a designated network application according to an application download instruction sent by the user, and the like.

Furthermore, the TV includes a smart user interface service (SUI service) module 109. The SUI service module 109 is used for recognizing voice of the user and/or recognizing an image of the user, and selecting a corresponding operation according to an identification result. In this embodiment, the SUI service module 109 mainly provides some man-machine interaction service, such as voice interaction service, image recognition service, and gesture recognition service. The SUI Service module 109 is connected to the system service module 104, and is used for executing the corresponding operation according to the command sent by the system service module 104. For example, when the system service module 104 receives voice button information sent by the user through pressing the OK button, the system service module 104 sends a command to the SUI Service module 109, the SUI Service module 109 starts a voice recognition function according to the received command, recognizes voice data input by the user, and selects a corresponding operation according to the recognition result.

Moreover, the TV also includes a net service module 110. The net service module 110 is used for selecting a network and connecting to the selected network.

In this embodiment, the net service module 110 is started by the system during booting, and is responsible for selecting a network and connecting to the network during booting.

Additionally, the step of the net service module 110 selecting the network and connecting to the selected network specifically includes automatically acquiring an IP, and writing in an environment variable; when an IP is acquired or no IP is acquired, sending a broadcast command; when no IP is acquired, automatically acquiring an IP again; detecting the network speed, download traffic, and upload traffic, and sending the detected data to the UI view service module.

The net service module 110 in this embodiment has the following functions: (1) automatically acquiring the IP, and writing in the environment variable; (2) providing a network set command interface, so that the user can manually select a network and set a dynamic or static IP and a push-to-talk over cellular (PoC) function; (3) when the network is connected (the IP can be acquired) or the network is disconnected, sending the broadcast command, and writing the environment variable; (4) automatically reconnecting the network; (5) detecting, by means of looping a ping fixed domain name, whether the TV has the right to access the Internet, and writing in the environment variable according to a detection result; (6) performing loop detection on the connection with the back server, sending a broadcast command when the connection is available or unavailable, and writing the environment variable; (7) detecting the network speed, download traffic, and upload traffic (a switch may be set), and sending a command to the UI view service module 105 for real-time display; (8) sending the command to the UI view service module 105 to display upload information or download information, such as the percentage, current speed, remaining time, and priority; (9) providing an upload or download task management interface for the external; and (10) implementing reading and writing of upload or download task information on a local xml file, so as to support breakpoint resume.

According to the second embodiment of the invention, the TV includes the TV service module 101, the user service module 102, the media service module 103, the system service module 104, the UI view service module 105, the DE service module 106, the group search service module 107, the App service module 108, the SUI service module 109, and the net service module 110. The system service module 104, the DE service module 106, and the net service module 110 are bottom service modules of the TV; the TV service module 101, the user service module 102, the media service module 103, the group search service module 107, the App service module 108, and the SUI service module 109 are intermediate service modules of the TV; the UI view service module 105 is a UI service module of the TV, which are specifically shown in FIG. 3. As shown in FIG. 3, when the service module in the TV requires invoking the UI view service module 105, data may be sent by sending a command SkyCmd and inheriting several data encapsulation subclasses of data based class SkyData.

Embodiment 3

In order to describe the running procedure of the TV according to the embodiments of the invention more clearly, illustration is made through specific application scenarios below.

1. When a user watches a TV program, the TV service module 101 is in foreground active state, at this time, if the user intends to share the TV program, the user only needs to press a share shortcut key, and a share interface pops out directly through the UI view service module 105 while the TV service module 101 continuous playing the TV program, so the user can input share content while continuously watching the TV, and click share to share the program through the user service module 102. The user can continue watching the TV after closing the share interface.

2. When a user watches a movie on an external device of the TV or on the Internet, if the user intends to switch to another movie, specifically, the user intends to search for another movie while watching the current one, and continue watching this movie while no other movie is required, instead of exiting the movie to search for another one and entering the movie again and fast forwarding the movie to the latest playback time when no better movie is found, at this time, the user may press a home button, a circular menu selection frame pops out on a player interface, the user selects a local media or network media list, the media service module 103 starts to provide the list, and the user browses the list while watching the movie. If the user finds a favorite movie, the user directly selects the movie to start playing the newly selected movie, and if the user does not find any better one, the user clicks return to continue watching the current movie.

3. When a user watches a TV or movie, if the user intends to know the network address of the TV without exiting the current content and entering the network setting, the user only needs to press the home button to pop out a circular menu selection frame, and select the network setting in the settings, the system displays the network status by overlapping a small window on the current interface, and the user presses the return button to close the small window and then continues watching the TV or movie.

4. When a user inserts an external mobile device in the TV, the system determines that the user intends to view the content in the mobile device, so a display frame pops out automatically to display a file list in the external device for viewing and selection of the user.

Those described above are common typical scenarios, most functions on the TV can be invoked for use through the operating system of the TV, and disappears by pressing the return button or disappears automatically after a period of time, thereby avoiding the complicated operation of exiting one application or function when it intends to use another application or function caused by independence of different applications.

In the embodiment of the invention, most functions of the TV are integrated into the background services, all functions are in background standby state, when the user requires a specific function, the service corresponding to the function can respond to the request of the user immediately and perform man-machine interaction with the user by means of a pop-out UI interface without interrupting the current use state of the user, the pop-out UI interface can be manually closed after finishing the processing of one function or may disappear automatically after a period of time without any interruption on the previous application or function of the user. Moreover, in the embodiment of the invention, the user may operate the TV through the touch screen of the external device connected to the TV, thereby alleviating the inconvenience of operating the TV system using the remote control, greatly improving the operation convenience of using the smart TV by the user, improving the intelligence of the TV, and providing better user experience.

It should be noted that all or a part of the steps according to the embodiments of the invention is implemented by hardware or a program instructing relevant hardware. Yet another aspect of the invention provides a non-transitory computer readable storage medium which stores computer executable instructions or program codes. The computer executable instructions or program codes enable one or more processors to complete various operations in the above disclosed method for operations of the TV. The storage medium includes, but not limited to, a magnetic disk, an optical disk, a read-only memory (ROM), a random access memory (RAM), random memory (RAM), flash dive, or the likes.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. A television (TV), comprising:
one or more processors; and
a memory storing computer-executable code executable at the one or more processors, wherein the code comprises:
a TV service module, for providing a standard interface for unifying digital television (DTV), analog television (ATV) and internet protocol television (IPTV) services;
a user service module, for managing users of a cloud platform to which the TV belongs, and executing a corresponding operation according to a one-button sharing instruction, a push instruction, and a reservation instruction;
a media service module, for collecting resources of an external device or a back server, and integrating the collected resources;
a system service module, for receiving a broadcast sent by a remote control, and forwarding an instruction corresponding to the broadcast sent by the remote control, so as to execute a corresponding operation;

a user interface (UI) view service module, for analyzing a component invoking instruction from the TV, and selecting the invoked component according to data carried in the component invoking instruction, so as to execute an operation corresponding to the component invoking instruction, wherein the operation comprises an operation of displaying data on a current interface or current application, an operation of hiding data, and an operation of adding data;

a data exchange (DE) service module, for receiving an operation instruction sent by an external device, and executing a corresponding operation according to the operation instruction, wherein the operation instruction comprises acquiring hardware information of the TV, and selecting an application of the TV; and a smart user interface (SUI) service module, for recognizing an image of the user, and selecting a corresponding operation according to a recognition result, wherein the system service module is configured such that, when Home button information broadcasted by the remote control is received, the system service module returns to a home page;

when Shuttle button information broadcasted by the remote control is received, the system service module sends a command to the UI view service module so that the UI view service module shows TV content obtained after the user slides the Shuttle button;

during signal source switching, the system service module sends a command to notify the TV service module; and when the user presses one-button sharing, the system service module sends a command to notify the user service module.

2. The TV according to claim 1, wherein the computer-executable code further comprises:
a group search service module for searching for network and local resources according to a key word or type input by the user.

3. The TV according to claim 1, wherein the computer-executable code further comprises:
an application (App) service module, for searching for a local application, deleting a local application, and searching, download managing, and deleting a network application.

4. The TV according to claim 1, wherein the computer-executable code further comprises:
a net service module, for selecting a network, and connecting to the selected network.

5. The TV according to claim 1, wherein, the TV service module is further adapted for:
recognizing a station caption of an ATV, and acquiring a current channel of the ATV; and
capturing an electronic program guide (EPG) of a DTV, and sending the captured EPG to the current channel of the ATV.

6. The TV according to claim 5, wherein, after the captured EPG is sent to the current channel of the ATV, the TV service module captures details or a video corresponding to the EPG in the IPTV.

7. The TV according to claim 1, wherein the system service module is further adapted for:
setting and acquiring a configuration item, communication with the UI View service, and calling up a configuration menu item;
setting system time, and setting an environment variable corresponding to the system time; and
setting a system language, and setting an environment variable corresponding to the system language.

8. The TV according to claim 1, wherein the DE service module for receiving the operation instruction sent by the external device, and executing the corresponding operation according to the operation instruction is adapted for:
receiving a connection request of the external device; and
after a connection with the external device is established, receiving the operation instruction sent by the user through a screen of the external device, or receiving the operation instruction sent by the user through a screen of the external device, and executing the corresponding operation according to the operation instruction.

9. The TV according to claim 4, wherein the net service module for selecting the network, and connecting to the selected network is adapted for:
automatically acquiring an IP, and writing in the environment variable;
when an IP is acquired or no IP is acquired, sending a broadcast command;
when no IP is acquired, automatically acquiring an IP again; and
detecting the network speed, download traffic, and upload traffic, and sending the detected data to the UI view service module.

10. A non-transitory computer-readable medium storing computer-executable code which, when executed by one or more processors, causes a television (TV) to perform a method of operations, wherein the method comprises:
providing a standard interface for unifying digital television (DTV), analog television (ATV) and internet protocol television (IPTV) services, by a TV service module;
managing users of a cloud platform to which the TV belongs, and executing a corresponding operation according to a one-button sharing instruction, a push instruction, and a reservation instruction, by a user service module;
collecting resources of an external device or a back server, and integrating the collected resources, by a media service module;
receiving a broadcast sent by a remote control, and forwarding an instruction corresponding to the broadcast sent by the remote control, so as to execute a corresponding operation, by a system service module;
analyzing a component invoking instruction from the TV, and selecting the invoked component according to data carried in the component invoking instruction, so as to execute an operation corresponding to the component invoking instruction, wherein the operation comprises an operation of displaying data on a current interface or current application, an operation of hiding data, and an operation of adding data, by a user interface (UI) view service module;
receiving an operation instruction sent by an external device, and executing a corresponding operation according to the operation instruction, wherein the operation instruction comprises acquiring hardware information of the TV, and selecting an application of the TV, by a data exchange (DE) service module; and
recognizing an image of the user by a smart user interface (SUI) service module, and selecting a corresponding operation according to a recognition result, by a smart user interface (SUI) service module, wherein the system service module is configured such that,
    when Home button information broadcasted by the remote control is received, the system service module returns to a home page;
    when Shuttle button information broadcasted by the remote control is received, the system service module sends a command to the UI view service module so that the UI view service module shows TV content obtained after the user slides the Shuttle button;
    during signal source switching, the system service module sends a command to notify the TV service module; and
    when the user presses one-button sharing, the system service module sends a command to notify the user service module.

11. The non-transitory computer-readable medium according to claim 10, wherein the method further comprises:
    recognizing a station caption of an ATV, and acquiring a current channel of the ATV; and
    capturing an electronic program guide (EPG) of a DTV, and sending the captured EPG to the current channel of the ATV.

12. The non-transitory computer-readable medium according to claim 11, wherein, after the captured EPG is sent to the current channel of the ATV, the method further comprises:
    capturing details or a video corresponding to the EPG in the IPTV.

13. The non-transitory computer-readable medium according to claim 10, wherein the method further comprises:
    setting and acquiring a configuration item, and communicating with the UI View service, so as to call up a menu of the configuration item;
    setting system time, and setting an environment variable corresponding to the system time; and
    setting a system language, and setting an environment variable corresponding to the system language.

14. The non-transitory computer-readable medium according to claim 10, wherein the method further comprises:
    searching for network and local resources according to a key word or type input by the user.

15. The non-transitory computer-readable medium according to claim 10, wherein receiving the operation instruction sent by the external device, and executing the corresponding operation according to the operation instruction comprises:
    receiving a connection request of the external device; and
    after a connection with the external device is established, receiving the operation instruction sent by the user through a screen of the external device, or receiving the operation instruction sent by the user through a screen of the external device, and executing the corresponding operation according to the operation instruction.

* * * * *